Aug. 25, 1936.    E. G. ROEHM    2,052,248
BROACHING MACHINE
Filed Oct. 26, 1933    7 Sheets-Sheet 5

Inventor
ERWIN G. ROEHM
By A. K. Parsons
Attorney

Aug. 25, 1936.  E. G. ROEHM  2,052,248
BROACHING MACHINE
Filed Oct. 26, 1933  7 Sheets-Sheet 7

Fig. 18

Inventor
ERWIN G. ROEHM
By AHParsons
Attorney

Patented Aug. 25, 1936

2,052,248

UNITED STATES PATENT OFFICE 2,052,248

BROACHING MACHINE

Erwin G. Roehm, Norwood, Ohio, assignor to The Cincinnati Milling Machine Co., Cincinnati, Ohio, a corporation of Ohio Application October 26, 1933, Serial No. 695,339

26 Claims. (Cl. 90—33)

This invention relates to improvements in machine tools and particularly to improvements in broaching machines.

An object of the invention is the provision of an improved broaching machine for substantially, continuously effecting broaching operations.

Another object of the invention is the provision of improved means for interlocking a pair of broaching rams and insuring their proper, timed sequential operation.

A further object of the invention is the provision of improved work supporting means for supporting and presenting work pieces to the action of the broaching tools.

A still further object of the invention is the provision of interlocked means or mechanism for effecting the operation of the ram operating mechanism and the work supporting and presenting mechanism.

A further and specific object of the invention is the provision of a novel indexible work supporting table for sequentially presenting a work piece thereon to the action of the broaching tool.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

As was noted above, this invention relates to improvements in broaching machines, which machines utilize a broaching tool which is either actuated relative to a work piece while traveling in a given direction or the work piece is actuated relative to the teeth of the broaching tool. Upon the conclusion of the cutting or broaching operation the parts are reversely actuated and travel idly to their initial position. At this time the work is replaced whereupon a feeding stroke is again initiated. With this type of construction there is considerable idle time due to the idle return of the parts and then the time necessary to replace the finished work piece with an unfinished one. It will, therefore, be evident that the production from the broaching machine as above described is far below the capacity of the machine.

By the present invention it is proposed to provide a pair of broaching tools, one of which is actually cutting while the other is being returned to its neutral or initial position, thereby substantially doubling the production from a broaching machine. Also, by the present invention the work piece finished by one broach is being replaced during the operation of the second broach on its work piece, thereby eliminating the non-productive time heretofore utilized for the replacement of the work. From this, it is believed now evident that the maximum production from the broaching machine of the present invention will be procured.

The machine of the present invention may comprise a bed 25 having rising thereabove to the rear thereof a pair of uprights or columns 26 and 27. Mounted on the bed 25 in front of the columns is a work supporting table 28 adapted to support a plurality of work pieces and alternately present said work pieces to the action of broaching tools.

The columns 26 and 27 are identical in construction, wherefore it is believed that a description of one of them will suffice for the other. Column 26 is provided centrally of its forward face with a guide way 29 in which is disposed a slide or ram 30. The forward face of the slide 30 may be provided with one or more grooves 31 receiving co-operating lugs or tongues 32 projecting from the broach carrier 33. Secured to the broach carrier 33 in any suitable or desirable manner is the broach tool 34 having the usual teeth on the outward face thereof.

Figure 18:
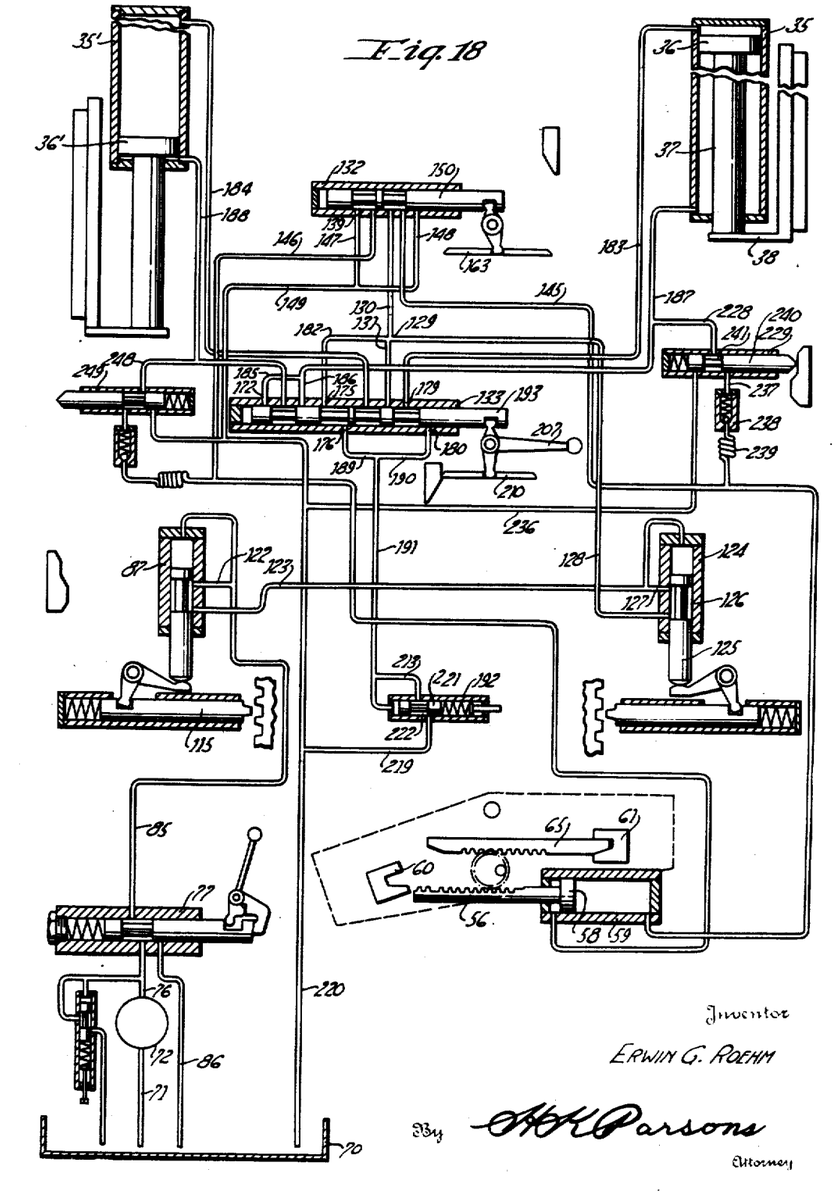
Figure 18 is a diagrammatic view illustrating the hydraulic circuit involved in this invention.

Behind the slide 30 the column 26 carries a cylinder 35 shown diagrammatically in section in Figure 18 in which is disposed a piston 36 from which projects the piston rod 37. The free end of the piston rod is connected by a bracket 38 with the ram or slide 30 whereby reciprocation of the piston 36 relative to the cylinder correspondingly actuates the ram or slide 30. The piston, as will later be made clear, is adapted to be actuated by an hydraulic medium, preferably oil under pressure.

The work supporting table 28 extends the full width of the machine and is provided substantially centrally of its length with an aperture receiving the bearing 39 of a pivot shaft 40. The shaft 40 is secured in a housing 41 integral with and projecting upwardly from the bed 25. On opposite sides of the bearing 39 the table 28 is provided with forward surfaces 42 and 43, which are inclined to one another but which are in alignment with the broach tool slides when in operative positions. The upper end of the pivot shaft 40 is mounted in a cross brace 44 extending over the top of the table 28 and having its ends secured to uprights 45 and 46 secured to or integral with the housing 41.

In order to effect the oscillation of the table 28 around the bearing 39 the housing 41 has rotatably mounted therein a shaft 47 carrying on its upper end a gear 48. The gear 48 has secured thereto eccentrically thereof a roller 49 adapted to enter the slot 50 in a member 51 secured to the under surface of the table 28. The member 51 and the center of the slot 50 are in line with the axis of the pivot shaft 40 and roller 49 when these parts are disposed in a central neutral position. The slot 50 is flanked by arms 52 and 53 against which the roller 49 engages for effecting the oscillation of the table. In order to rotate the gear 48 the shaft 47 has keyed or otherwise secured to it near its lower end a gear 54 meshing with the rack teeth 55 formed on a piston rod 56. The piston rod 56 is slideable through a bearing 57 carried by the housing 41 interiorly thereof. The free end of the piston rod 56 carries a piston 58 disposed within a cylinder 59 supported by the housing 41. The piston 58 is adapted to reciprocate relative to the cylinder 59 for rotating the shaft 47 and parts carried thereby, and thereby effect the oscillation of the table 28. Hydraulic means are employed for effecting the operation of the piston 58 as will be described in detail later. In order to lock the table in its operative positions there is provided on the under surface of the table at opposite ends thereof locking blocks 60 and 61. The locking blocks are respectively provided with an inclined face 62 co-operating with wedge shaped ends 63 and 64 of a locking bar 65. The locking bar 65 is provided intermediate its ends with rack teeth 66 co-operating with the gear 48.

In the operation of the table, sufficient lost motion is provided between the roller 49 and arms 52 and 53 of member 51 whereby the table is completely oscillated before the locking bar 65 comes into play and consequently the locking bar has released the table before the oscillation thereof is initiated. From this it will be seen that the table is alternately positioned with respect to the two rams 30 and then locked in operative position.

Figure 2:
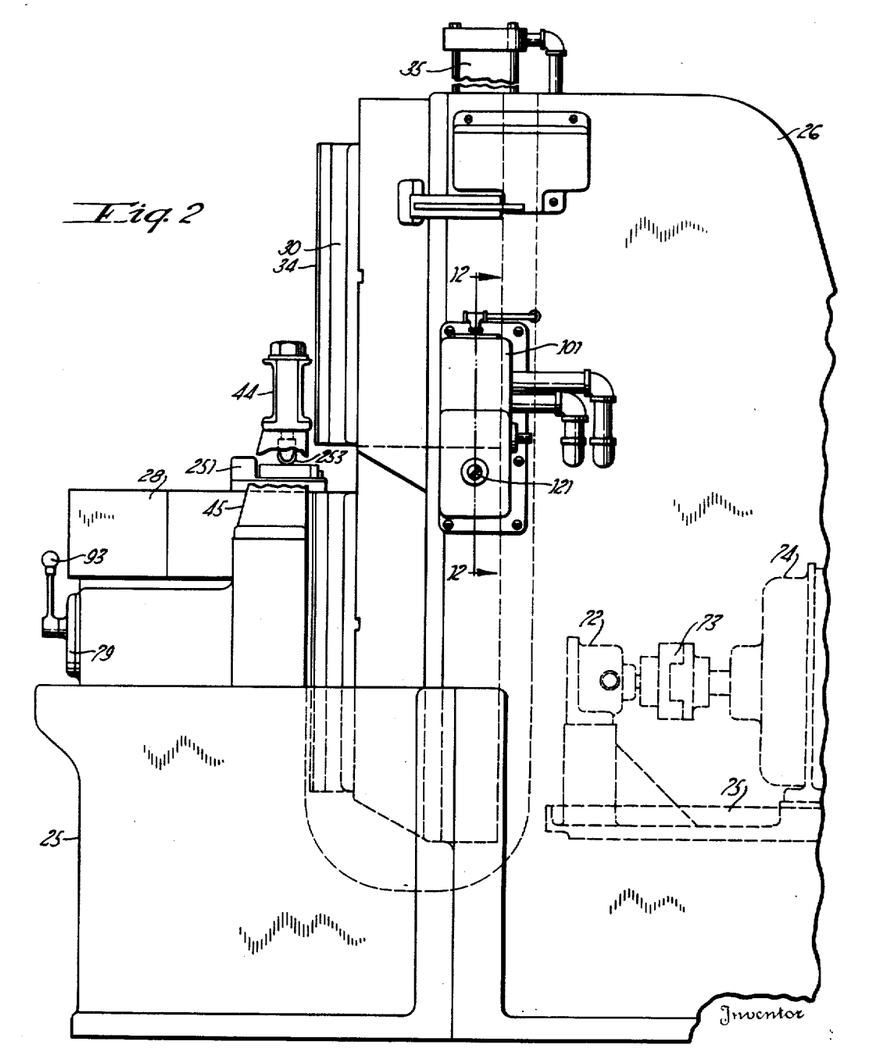
Figure 2 is a fragmentary side elevational view of the machine shown in Figure 1.
Figure 3:
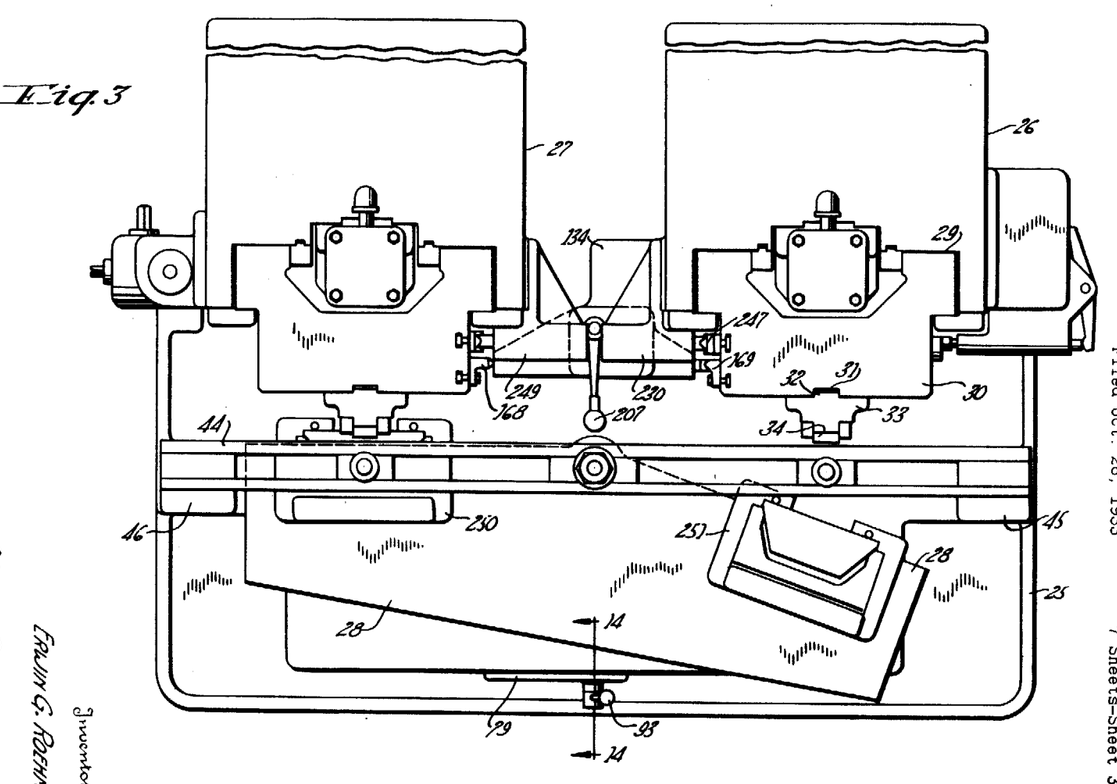
Figure 3 is a top plan view of the machine shown in Figures 1 and 2.
Figure 4:
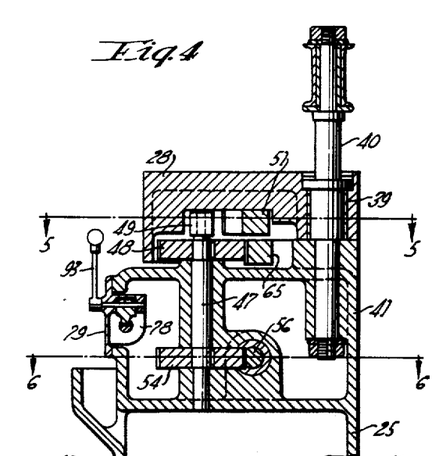
Figure 4 is a fragmentary vertical sectional view taken on line 4—4 of Figure 1.
Figure 5:
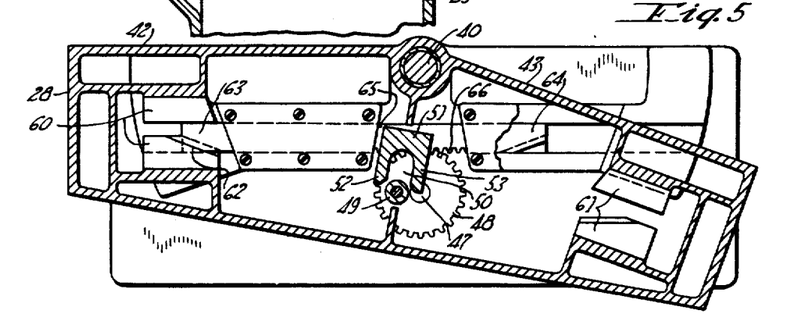
Figure 5 is a horizontal sectional view taken on line 5—5 of Figure 4.
Figure 6:
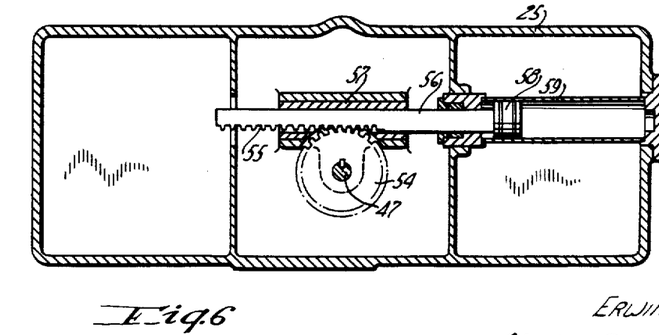
Figure 6 is a horizontal sectional view taken on line 6—6 of Figure 4.

The hydraulic circuit and control mechanism is shown diagrammatically in Figure 18, and as there shown, comprises a sump or tank 70 containing the medium, preferably oil, to be circulated through the system. This tank 70 may conveniently be disposed within the bed of the machine and connected by a suction pipe 71 to a pump or other circulating member 72. As shown in Figure 2, the pump 72 is disposed within a compartment formed in one of the uprights or columns and is connected by a coupling 73 with a motor 74, also disposed within this compartment. The pump 72 and motor 74 may conveniently be secured to a suitable base plate 75, in turn secured to the base of the said compartment.

Extending from the discharge side of the pump 72 is a conduit or pipe 76 terminating in a valve indicated generally by the numeral 77 in Figure 18. This valve 77 is shown structurally in Figures 14 and 15 and may be termed an emergency stop valve. The valve comprises a casing 78 integral with or secured to a plate 79 secured to the forward face of the bracket 41 in convenient reach of the operator. Disposed within a bore in bracket 78 is a valve bushing 80 having formed therethrough a plurality of sets of radial ports 81, 82 and 83, each set being encircled by a similar circumferential groove 84 formed in the exterior of the bushing 80. It is with the ports 82 that the conduit 76 connects, while the ports 81 have connected with them one end of a pipe or conduit 85 and the ports 83 have connected with them one end of the pipe or conduit 86. The pipe or conduit 86 is a return conduit and terminates in the sump or tank 70, while the pipe 85 terminates in a valve indicated generally by the numeral 87, the purpose of which will be described later.

Disposed within the bore in the valve bushing 80 is a sliding valve 88 having formed intermediate its ends a cannelure 89 adapted in its different positions of adjustment for connecting the ports 81 and 82 and the ports 82 and 83. The valve 88 is provided near one end with a notch 90 receiving the valve shifting finger 91 secured to a shaft 92. The shaft 92 is journaled in suitable bearings provided by the bracket 78 and projects beyond the forward face of the plate 79 thereof to receive a lever 93. Also pivotally mounted on the shaft 92 is a latch 94 spring actuated by spring 95 to move in a clockwise direction or into latching engagement. The latch 94 and the valve shifting finger 91 are provided with contacting portions as at 96 whereby movement of the finger 91 in a counterclockwise direction first shifts the latch 94 out of engagement with the valve 88. To permit this operation of the latch and engagement of the finger with the valve there is provided lost motion between the said finger and valve as is clearly illustrated in Figure 15. As a matter of fact the finger 91 is employed for shifting the valve to the left only, utilizing a spring for shifting the valve to the right after the finger has rendered the latch inoperative. For this reason the bore through the bushing is closed at one end by the plug 97 which serves as one abutment for a spring 98, abutting on its other end with the valve member 88.

Figures 14, 15, 16, 17:
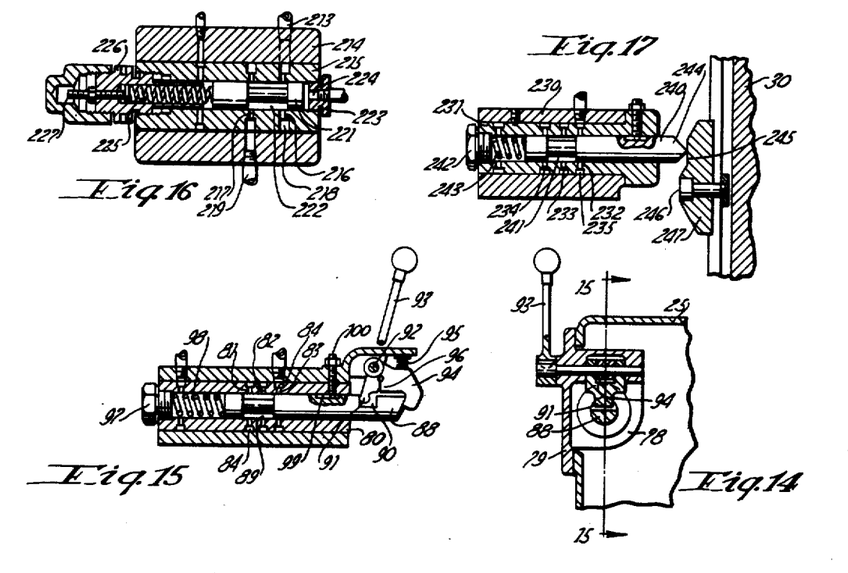
Figure 14 is a fragmentary sectional view taken on line 14—14 of Figure 3.
Figure 15 is a sectional view taken on line 15—15 of Figure 14.
Figure 16 is a sectional view through a valve for maintaining back pressure in the system and forming a detail of the invention.
Figure 17 is a sectional view of a valve utilized for supplying additional operating fluid to the broach cylinders and forming a detail of the invention.

During the normal operation of the machine the valve is latched open in the positions shown in Figures 15 and 18, thereby connecting the ports 82 and 81 or connecting the conduits 76 and 85. In the event, however, an emergency arises necessitating the immediate shutting down of the machine the operator merely engages the lever 93 and actuates same in a counterclockwise direction, thereby releasing the latch 94 and permitting the spring 98 to shift the valve to the position for connecting the ports 82 and 83 thereby short circuiting the pump 72 on the tank 70. In order to hold the valve 88 in the proper position for axial adjustment and to prevent any rotation thereof the said valve is provided with a groove 99 receiving the end of a screw 100.

Figure 12:
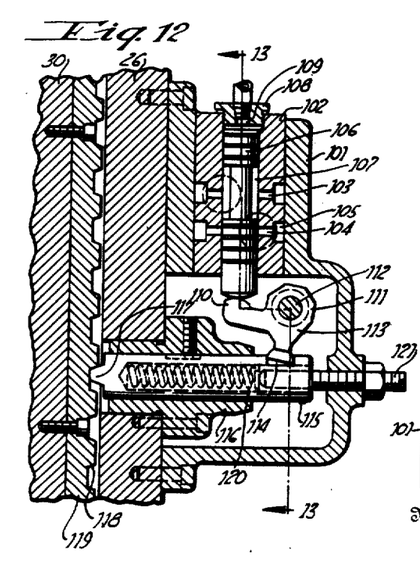
Figure 12 is a sectional view taken on line 12—12 of Figure 2.
Figure 13:
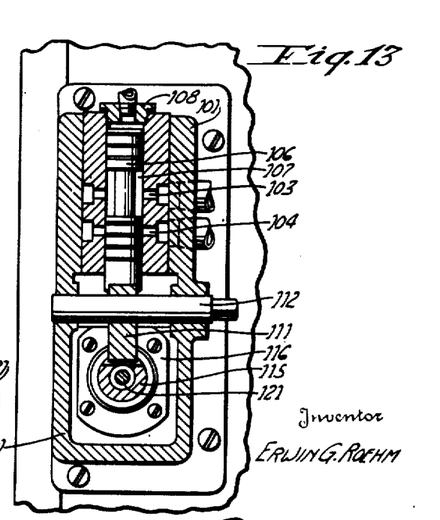
Figure 13 is a sectional view taken on line 13—13 of Figure 12.

The valve 87 with which the other terminus of the conduit 85 connects, operates to release a latch or locking mechanism utilized for holding the rams in their upper position when the machine is shut down and there is no pressure in the system. This valve and latching mechanism is illustrated diagrammatically in Figure 18 and structurally in Figures 12 and 13, and as there shown comprises a bracket 101 secured in any desirable manner to the outer surface of the column 27. Pressed into a bore in the housing 101 is a valve bushing 102 having formed therethrough a plurality of sets of radial ports 103 and 104, each set being encircled by a circumferential groove 105 in the exterior of the bushing 102. The bushing 102 is provided with a bore in which is disposed a piston type of valve 106 having formed centrally thereof a cannelure 107. The end of the bore in the bushing 102 is closed by a plug 108 through which is formed a port 109 receiving the end of the conduit 85 above referred to.

The lower end of the piston valve 106 engages one arm 110 of a bell crank 111 secured to a shaft 112 journaled in the housing 102. The other arm 113 of the bell crank 111 is received in a notch 114 formed in the end of a locking plunger or bolt 115. The locking plunger 115 is mounted for reciprocating movement in a bracket 116 secured to the column 27 and disposed interiorly of the housing 101, and the locking plunger is provided on its inner end with a lug or nose 117 adapted to enter the space between adjacent lugs or teeth 118 formed on a plate 119. This plate 119 may in effect be a rack and is secured to the slide or ram 30 throughout its entire length so that the plunger 115 may lock the ram in any position it may be in upon shutting down of the machine. The plunger 115 is shifted into locking position by a spring 120 disposed within a counterbore formed therein and abutting on one end with the base of the said counterbore and on the other with an abutment plate contacting the inner end of a spring tension adjusting screw 121 carried by the housing 101.

The ports 103 of the bushing 102 have connected therewith one terminus of a branch pressure conduit 122 which extends from the main conduit 85 while the ports 104 have connected with them one terminus of a conduit 123 which terminates at its other end in a locking valve mechanism indicated generally by the numeral 124. Pressure in the conduit 85 will actuate the piston valve 106 downwardly, thereby oscillating the bell crank 111 about the axis of the shaft 112 and withdraw the locking bolt 115 from engagement with the bar 119 against the resistance of the spring 120. As the said piston valve 106 is disposed from the position shown in Figure 12 to that shown in Figure 18 the cannelure therein will connect the ports 103 and 104, thereby connecting the branch pressure conduit 122 with the conduit 123.

The locking valve 124 is similar in all respects to the valve 87 except that it co-operates with the second tool slide or ram 30 carried by the column 26. This valve 124 therefore includes a second piston type of valve 125 similar to the piston valve 106 and has therein a cannelure 126 for connecting the branch conduit 127 from the conduit 123 with a conduit 128. The operation of the valve 124 will first disengage the locking bolt similar to the bolt 115 to release the slide 30 of the column 26, whereupon the conduits 127 and 128 are connected as above described. From the foregoing it will be noted that the two tool slides or rams are locked against movement when the machine is completely shut down and as soon as pressure is developed in the hydraulic system the said locks are immediately released so that the machine may then be operated in the normal manner.

Figure 1:
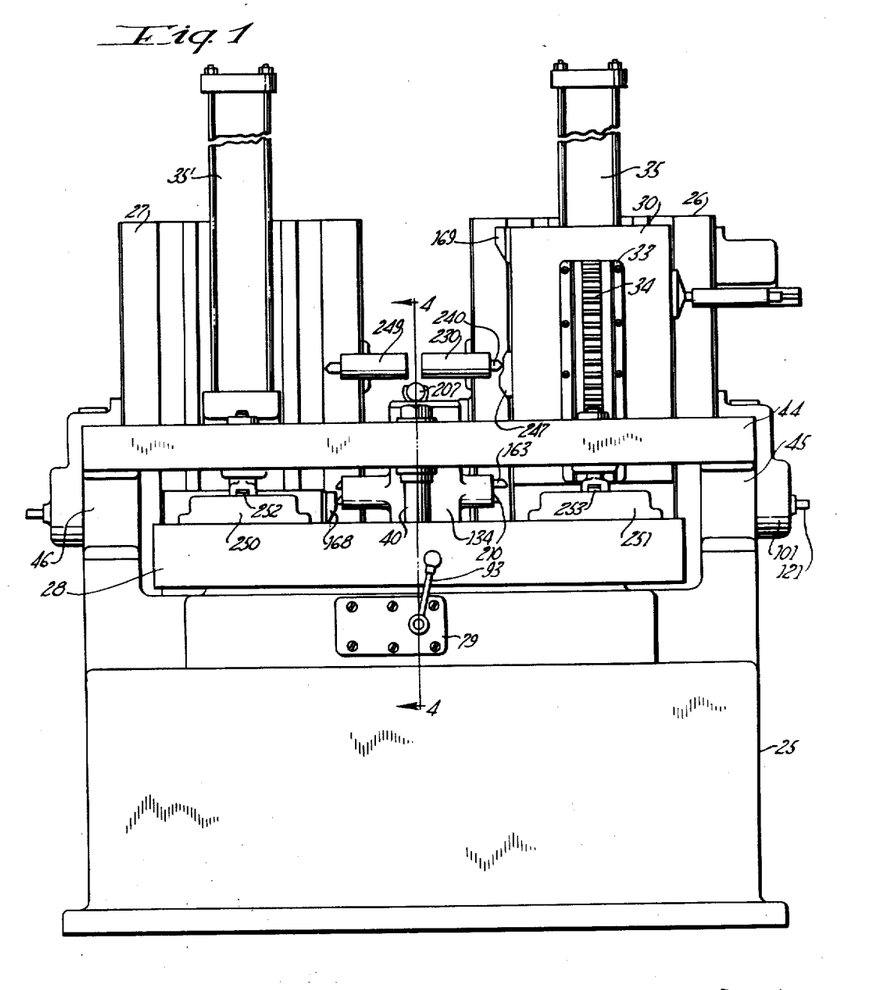
Figure 1 is a front elevation of a broaching machine embodying improvements of this invention.

The conduit 128 terminates at its other end in a coupling 129 from which branch pressure conduits 130 and 131 extend, respectively terminating in valves indicated generally by the numerals 132 and 133. These valves 132 and 133 are contained in the same housing and are shown structurally in Figures 7 to 11 inclusive. This valve structure comprises a housing 134 having a flange 135 whereby it is secured to the side of one of the columns 26 and 27, shown in Figure 1 as being secured to the column 26 in the space between adjacent surfaces of the said columns. The position of this valve housing is such that it may be readily operated by the operator when disposed in front of the machine.

The housing 134 has formed integral therewith valve casings 136 and 137, the former comprising the valve 132 which controls the movement of the table piston, while the latter encloses the valve 133 and controls the operation of the ram pistons.

The valve casing 136, therefore, has pressed into it a valve bushing 138 through which is formed a plurality of sets of radial ports 139, 140, 141, 142 and 143, each set being encircled by a circumferential groove 144 formed in the exterior of the bushing 138. It is with the ports 141 that the branch pressure conduit 130 connects, while the ports 142 are connected with one end of a conduit 145 which terminates at its other end at the right hand end of the table operating cylinder 59. The ports 140 connect with one end of a conduit 146 which connects at its other end with the left hand end of the table operating cylinder 59. The remaining sets of ports 139 and 143 are respectively connected with one terminus of branch discharge conduits 147 and 148 which empty into a conduit 149, ultimately terminating in the sump or tank 70.

Mounted within the bore in the valve bushing 138 is a spool type valve 150 having cannelures 151 and 152 adapted to alternately connect the branch pressure conduit 130 with the table cylinder conduits 145 and 146 and alternately connect the said table conduits with the branch discharge conduits 147 and 148. In order to shift this valve the forward end thereof is provided with a notch 153 receiving the end of an arm 154 projecting from valve shifter member 155. The valve shifter member 155 has formed therein notches 156 co-operating with a spring loaded detent 157 to form a load and fire mechanism for actuating said valve. The valve shifter 155 is keyed to a sleeve or hollow shaft 158 journaled in bearings 159 and 160 provided by the valve housing 134.

Figure 8:
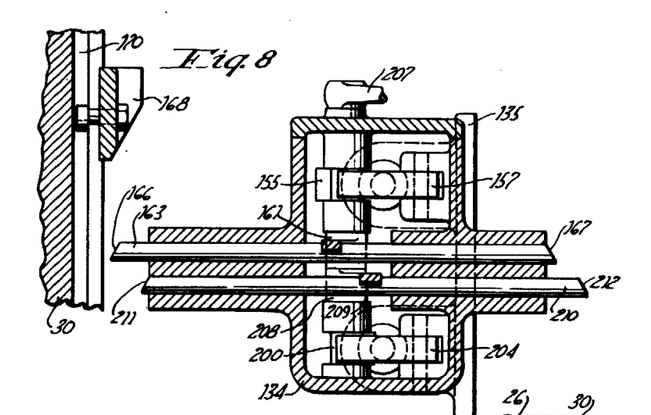
Figure 8 is a sectional view taken on line 8—8 of Figure 7.
Figures 10, 11:
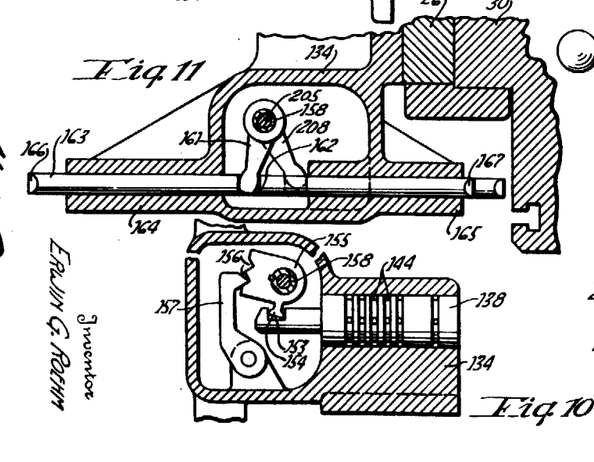
Figure 10 is a view taken on line 10—10 of Figure 7 showing certain parts in elevation.
Figure 11 is a sectional view taken on line 11—11 of Figure 7.

The sleeve 158 is adapted to be oscillated by the slides or rams at a definite point in their movement, namely, when they reach their lowermost position for thereby effecting the operation of the valve 150 and an oscillation or indexing of the work supporting table. For this reason the sleeve 158 has secured to it a finger 161 disposed in a slot 162 of a horizontally shiftable rod 163. The rod 163 is disposed for axial movement in bearing lugs 164 and 165 projecting laterally from the housing 134. The ends of the rod 163 are beveled as at 166 and 167 and respectively operated by the slides or broach rams 30 of the columns 26 and 27. As seen in Figure 8 the said slides or rams are provided with a T slot 170 whereby the dogs 168 and 169 are adjustable relative thereto, which adjustment is dependent upon the working stroke of the broach.

From the foregoing it will be noted that when either of the broach rams 30 reaches the bottom of its stroke it will through the dogs 168 and 169 reversely actuate the spool valve 150 and connect the hydraulic pressure in the line 130 with either of the conduits 145 and 146 and thereby operate the table piston 58 and effect the indexing of the said table. It should be noted that this operation takes place substantially at the time the broach has completely finished its stroke.

Referring now to the valve 133 for controlling the operation of the rams, the casing 137 has pressed into it valve bushing 171 through which is formed a plurality of sets of radial ports 172, 173, 174, 175, 176, 178, 179 and 180, each set of which is encircled by a similar circumferential groove 181 formed exteriorly of the bushing 171. It is with the ports 178 that the branch pressure conduit 131 connects while a second branch pressure conduit 182 connects with the ports 174. The ports 179 are connected with one end of a conduit 183 terminating at its other end in the upper end of the cylinder 35 associated with the column 26. The ports 177 likewise connect with one end of a conduit 184 that terminates in the upper end of cylinder 35' associated with the column 27. The ports 172 and 174 respectively connect with branch conduits 185 and 186 connected with the conduit 187 terminating at the lower end of the cylinder 35. Ports 173 connect with one end of a conduit 188 terminating at the lower end of the cylinder 35'. The ports 176 and 180 respectively connect with one end of branch conduits 189 and 190 emptying into return conduit 191 which terminates in a valve indicated generally by the numeral 192 and provided for maintaining a definite back pressure in the system which prevents the rapid descent of the ram pistons, as will later be made clear.

Disposed within and axially shiftable through the bore in the valve bushing 171 is a spool type valve 193 having formed therein cannelures 194, 195, 196 and 197 adapted in the different positions of adjustment of said valve for connecting in different combinations the sets of radial ports. Valve 193 is adapted to have three operative positions, namely, a neutral position shown in Figures 7 and 18, and an operative position to the right and left thereof. In order to effect the shifting of this valve it is provided at its forward end with a notch 198 receiving the finger or lug 199 projecting from valve shifter 200. The valve shifter 200 is provided with notches 201, 202 and 203 respectively determining the right hand, neutral and left hand positions of the valve. In order to stop the valve in its several positions a spring loaded detent 204 is provided which co-operates with notches in the valve shifter.

In order to actuate the valve shifter 200 it is secured to a shaft 205 journaled for rotative movement in bearings 206 provided by the housing 134, as well as journaled in the sleeve or hollow shaft 158. The shaft 205 extends beyond the housing to receive a manually operable lever 207. The valve 193 is adapted to be manually shifted as just described when initiating the movement of one of the ram pistons, and is adapted to be automatically shifted at the conclusion of the ram stroke. The mechanism for automatically shifting the valve comprises a lever 208, similar to the lever 161 on the sleeve or hollow shaft 158, which is received in a notch 209 formed in a rod 210 axially shiftable relative to the housing bearings 164 and 165. The ends of the rod 210 are beveled as at 211 and 212 for engagement with the dogs 168 and 169 after said dogs have engaged and shifted the rod 163. From this it will be seen that the valves 150 and 193 are actuated sequentially, thereby first effecting an oscillation or indexing of the table whereupon the operating ram is brought to a stop.

Referring back now to Figure 18, and continuing with the hydraulic circuit, it will be noted that the discharge or return conduit 191 has a branch conduit 213, also terminating in the back pressure valve 192. This back pressure valve 192 is shown structurally in Figure 16 and comprises a housing or casing 214 in which is pressed a valve bushing 215. The valve bushing 215 is provided with two sets of radial ports 216 and 217, each set being respectively encircled by a similar circumferential groove 218 formed exteriorly of the bushing 215. The conduit 213 connects with the ports 216, while the ports 217 have connected therewith one end of a conduit 219 that empties into the main discharge conduit 220, terminating in the sump or tank 70.

Mounted within the bore in the valve bushing 215 is a spool type valve 221 having a cannelure 222 adapted to more or less uncover the ports 217 and effect a restricted discharge therethrough into the conduit 219. The position of the valve 221 and consequently the amount of discharge through the ports 217 is determined by the pressure in the conduit 191. For this reason the bore through the valve bushing 215 is closed at one end by a plug 223 having formed therethrough a port 224 in alignment with the said conduit 191.

From the foregoing it will be seen that the pressure in the conduit 191 acts on and attempts to axially shift the valve 221. This movement of the valve, however, is yieldably retarded by means of a spring 225 abutting on the other end of the valve and mounted within a spring housing 226 secured to the bushing at the other end of the bore therethrough. The spring housing 226 carries an adjusting screw 227 which forms the second abutment for the spring and whereby the tension of the spring may be varied. The spring 225 is initially tensioned to substantially close off the ports 217 as when there is no pressure or a very low pressure in the conduit 191 acting on the valve 221. However, as the said pressure increases due to the upward movement of one of the pistons 36 or 36' tending to expel the impelling fluid on its retracting stroke, the increase in pressure in line 191 will react against the end of valve 221 variably opening the same to allow escape of the fluid by way of conduits 213 and 219. It will thus be seen that this valve serves to maintain a constant pressure of predetermined amount resisting movement of the pair of inter-coupled broach ram motors so that when the machine is in operation a predetermined resistance will insure a constant steady movement and prevent jambing of the broach initially into the work or surging under varying work resistance conditions or the like.

Extending from the conduit 187 is a branch conduit 228 terminating in a fluid make-up valve indicated generally by the numeral 229. This valve is shown structurally in Figure 17 and is utilized for maintaining the broaches in a definite relation to one another during their movements with the rams. In other words to prevent the rams from getting out of timed relation, such as due to an insufficient amount of fluid for raising one ram when the other is descending or an overabundant amount of fluid, which would tend to raise one ram higher than its normal position during the descent of the other, the make-up valve is employed.

As will be seen from Figure 17 this valve comprises a housing 230 secured to the inner face of the column 26. Pressed into a bore in the housing 230 is a valve bushing 231 having formed therethrough a plurality of sets of radial ports 232, 233 and 234, each set being encircled by a similar circumferential groove 235 formed exteriorly of the bushing 231. It is with the ports 233 that the conduit 228 connects, while the ports 234 are connected with one end of a conduit 236 terminating at its other end in the main discharge conduit 220 and the ports 232 connect through a conduit 237 with the table conduit 145. Disposed within the conduit 237 is a one-way check valve 238 and an hydraulic resistance 239.

Disposed within the bore through the valve bushing 231 is a valve 240 having formed therein a cannelure 241 for connecting the several sets of radial ports in different combinations. One end of the bore through the valve bushing 231 is closed by a plug 242 forming one abutment for a spring 243 which abuts on its other end with the valve for shifting it to its normal position—that of connecting the sets of radial ports 232 and 233. In order to shift the valve against the resistance of the spring 243 the forward end thereof is beveled to provide a nose as at 244 adapted to be engaged by cam faces 245 and 246 on an adjustable dog 247 carried by the ram or broach slide 30 associated with column 26.

The operation of this fluid make-up valve is as follows: when the piston 36 is ascending from its lowermost position the valve is disposed in its normal position, that of connecting the radial ports 232 and 233, and therefore connects the conduits 237 and 228. Since at this time there is no pressure in the conduit 145 there will be no flow through conduit 237 into conduit 228. Also there will be no flow from conduit 228 through conduit 237 because of the one way check valve 238. When, however, the piston 36 reaches its upper limit of movement due to the flow through the conduit 187 as effected by the descent of the piston 36', the flow in the conduits 228 and 187 ceases, whereupon, if the piston 36 is not up to its normal position the pressure now in conduit 145 and conduit 237, due to the oscillation of the table as above described, will flow through the conduits 237 and 187 to further raise the said piston. If, however, the pistons are in timed relation and it reaches its normal position at the same time that the piston 36 is at its lowermost position the dog 247, through the cam face 245, closes off communication between conduits 237 and 228 and thereby prevents any further movement of the piston 36. If, however, the piston 36 is raised above its normal position before the piston 36' reaches its lowermost position the second cam face 246 of the dog 247 comes into play and shifts the valve to connect the conduits 228 and 236, thereby draining the excess pressure oil from the cylinder 36 to the sump, this draining continuing until the dog 247 is lowered to engage the valve with its cam face 245 whereupon all movement stops.

Extending from the conduit 188 is a conduit 248 which terminates in a valve indicated generally by the numeral 249. The valve 249 is similar in all respects to the valve 229 and controls the position of the piston 36' in the same manner as the piston 36 is controlled. From this it will be seen that the positions of the pistons 36 and 36' is at all times maintained in timed relation and hydraulically prevented from getting out of proper relationship with the work and one another.

In order to hold the work clamped on the table during the broaching operation thereof the said table is provided with a pair of work holding fixtures 250 and 251, one at each end of the table. Co-operating respectively with said fixtures are clamping rollers 252 and 253 mounted in the cross brace 44 which overlies the table.

The complete operation of the mechanism is as follows: the electric motor 74 is started for effecting the operation of the pump 72. As soon as the pump has developed the desired amount of pressure the emergency stop valve 77 is actuated by the hand lever 83 to the position shown in Figure 18, thereby connecting the pressure in the line 76 with the conduit 85. The hydraulic medium or pressure in the conduit 85 acts on the piston type valve associated with the valve 87, thereby depressing said valve against the spring 120 and unlocking the ram associated with the column 27, for example. When this valve reaches its lowermost or unlocking position it connects the pressure in the branch pressure conduit 122 with the conduit 123, whereupon the pressure operates the piston valve associated with the valve 124 thereby unlocking the ram associated with the column 26. When this piston valve reaches its lowermost or unlocking position it connects the pressure in the branch conduit 127 with the conduit 128.

At this time the valve 133 is manually actuated through the lever 207. As shown in Figure 18 this movement of the valve is to the left, thereby connecting the branch pressure line 131 with the conduit 183 which extends to the top of the cylinder 35. It should be noted at this time that the valve 132 remains in the position shown in Figure 18, thereby connecting the pressure in branch pressure line 130 with the conduit 145 terminating at the right hand end of the table cylinder 59 and holding the piston 58 therein in the position shown and presenting the work carried, for example in the work fixture 251, to the action of its broach.

With the pressure in the conduit 183 the piston 36 is actuated downwardly for correspondingly shifting the ram 30 of the column 26 and broach tools carried thereby. This movement of the piston effects the discharge of the medium on the other side of the piston from the cylinder 36 through the conduit 187. This conduit 187 is at this time connected with the conduit 188 which terminates at the lower end of the cylinder 35' for effecting an elevation of the piston 36' associated therewith. This upward movement of the piston 36' carries with it the ram associated with column 27 for raising said ram to its upper position. It should be noted at this time that the ram of the column 26 is operating through its cut stroke, while the ram of the column 27 is passing through its idle stroke. The upward movement of the ram 36' effects a discharge of the medium ahead of the piston 36' through the conduit 184 which is now connected with the discharge conduits 189 and 190 to the back pressure valve 192. Depending upon the resistance offered to the cut, and as above explained, the discharge through the conduits 219 and 220 to the sump or tank 70 is controlled as above fully described.

This movement of the piston 36 continues until the cut is complete, whereupon the dog 169 engages the valve shifter rod 183 for effecting through the connections above described the operation of the valve 132. The movement of this valve 132, as seen in Figure 18, is now to the right, thereby connecting the branch pressure conduit 130 with the table cylinder conduit 146 and supplying pressure to the left hand side of the table piston 58. At the same time, the table conduit 145 is connected with discharge conduit 148 whereby the table is then indexed to remove the work in the work fixture 251 from proximity with its broach and position the work fixture 250 in alignment with its broach.

Continued movement of the ram 36 now causes the dog 169 to engage the rod 210, thereby shifting the valve 133 to the neutral position shown in Figure 18. At this time the branch pressure conduit 182 is connected with the discharge conduits 189 and 191 to the tank or sump 70.

If the piston 36' does not reach its proper position the make-up valve 249 now comes into play to correct the position thereof as fully explained above. If the new work piece is properly secured in its fixture 250 the operation above described will then be repeated, this time, however, effecting the descent of the piston 36' and the ascent of the piston 36. To effect this operation the operator engages the lever 207 and shifts the valve 133 to the right as seen in Figure 18 and not to the left because the dog 169 will now prohibit a movement of this valve to the left instead of the dog 168 as was initially assumed.

As usual with machine tools a coolant stream is directed on the tool and work during the tooling or broaching operation. In the present construction it is desirable to shut off one stream to one work piece and its tool when the other is in operation. In order to conveniently effect this control of the coolant the coolant valve is connected with the ram valve actuating shaft 205 wherefore the said coolant valve is operated in one direction by power means and in the other direction manually or the valve is manually opened and automatically or power closed.

Figures 7, 9:
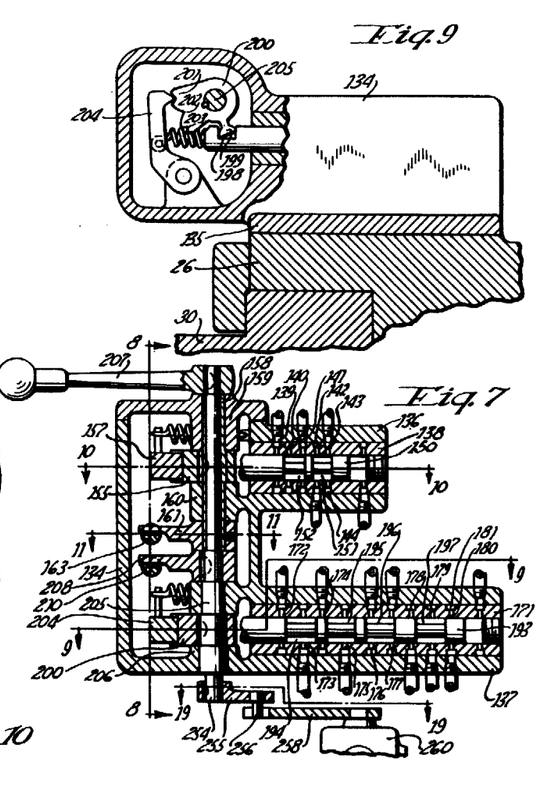
Figure 7 is a vertical sectional view through the valve casing taken on a line lying in the same plane with line 4—4 but disposed to the rear thereof.
Figure 9 is a view partly in section and partly in elevation taken on line 9—9 of Figure 7.
Figure 19:
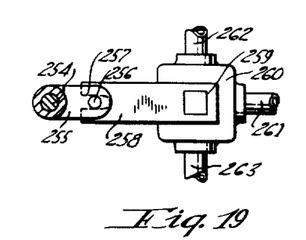
Figure 19 is a plan view of the coolant control valve as particularly seen from line 19—19 on Figure 7.

This mechanism is shown in Figures 7 and 19 and, as there shown, the shaft 205 has projecting from its lower end a reduced portion 254 to which is pinned or otherwise secured a link 255. The link 255 has extending from the end thereof a pin 256 received in a slot 257 formed in valve actuator 258. The valve actuator is secured in any desirable manner to the valve stem 259 projecting from the coolant control valve 260. The valve 260 is of the three-way type, having connected to the common opening the supply pipe 261, and has projecting from opposite sides thereof the delivery pipes 262 and 263, the former delivering the coolant to the left hand ram or that associated with the column 27 while the latter goes to the right hand ram or that associated with column 26.

It is believed that the operation of this valve will be self-evident since the shaft 205 is in a neutral position when the rams are both stationary and at this time the valve 260 will be shut off, while the said shaft is oscillated to either the right or the left to effect the operation of the different rams independently and will, therefore, open the valve to one or the other delivery pipes as the said ram is operated.

What is claimed is:—

1. A broaching machine including a bed, a pair of broaching rams carried thereby and alternatively actuable through a broaching stroke, a work supporting table mounted on the bed for limited swinging movement, a pair of work holders carried by the table in staggered relation, and means for effecting oscillation of the table whereby one of said working holders is presented in operative relation to its associate ram during the broaching stroke of the ram while the other work holder is simultaneously retracted with respect to the other ram into a loading position.

2. A broaching machine including a bed, a pair of broaching rams carried thereby and alternatively actuable through a broaching stroke, a work supporting table mounted on the bed for limited swinging movement, a pair of work holders carried by the table in staggered relation, means for effecting oscillation of the table whereby one of said working holders is presented in operative relation to its associate ram during the broaching stroke of the ram while the other work holder is simultaneously retracted with respect to the other ram into a loading position, a locking device carried by the bed, and means on the table selectively engageable by the locking device for securing either work holder in operative relation to its associated ram.

3. A broaching machine of the character described, including a bed, a pair of supports rising from the bed, broaching rams carried by the supports for actuation of broaching tools, means for alternatively actuating the rams through a broaching stroke, a table member pivoted intermediate the rams, and work supports carried by the table at opposite sides of the pivot, whereby oscillation of the table about its pivot will operatively relate one of the work supports to its associate ram and simultaneously retract the other work support into loading position.

4. A broaching machine of the character described, including a bed, a pair of supports rising from the bed, broaching rams carried by the supports for actuation of broaching tools, means for alternatively actuating the rams through a broaching stroke, a table member pivoted intermediate the rams, work supports carried by the table at opposite sides of the pivot, whereby oscillation of the table about its pivot will operatively relate one of the work supports to its associate ram and simultaneously retract the other work support into loading position, an hydraulic actuator for effecting oscillation of the table, and means operable by movement of a ram for effecting actuation of said hydraulic actuator.

5. A broaching machine of the character described, including a bed, a pair of supports rising from the bed, broaching rams carried by the supports for actuation of broaching tools, means for alternatively actuating the rams through a broaching stroke, a table member pivoted intermediate the rams, work supports carried by the table at opposite sides of the pivot, whereby oscillation of the table about its pivot will operatively relate one of the work supports to its associate ram and simultaneously retract the other work support into loading position, an hydraulic actuator for effecting oscillation of the table, means operable by movement of a ram for effecting actuation of said hydraulic actuator, means for locking the table selectively in its positions of oscillation, and connections between the hydraulic table actuator and said locking means for effecting releasing and locking of the table in predetermined timed relation to the oscillation thereof.

6. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, and means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar substantially as and for the purpose described.

7. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar, individual hydraulic motors for operation of the rams and for operation of the table oscillator, an hydraulic pressure source for effecting operation of said motors, and means operable by an individual ram motor during its cutting stroke for effecting actuation of the table motor to retract the associated work support from said ram.

8. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar, individual hydraulic motors for operation of the rams and for operation of the table oscillator, an hydraulic pressure source for effecting operation of said motors, means operable by an individual ram motor during its cutting stroke for effecting actuation of the table motor to retract the associated work support from said ram, and additional ram actuated means for subsequently stopping the machine at the completion of the operative stroke of the ram.

9. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar, individual hydraulic motors for operation of the rams and for operation of the table oscillator, an hydraulic pressure source for effecting operation of said motors, means operable by an individual ram motor during its cutting stroke for effecting actuation of the table motor to retract the associated work support from said ram, additional ram actuated means for subsequently stopping the machine at the completion of the operative stroke of the ram, and alternatively available manual control means selectively operable to check all movement of the machine at any point during the stroke thereof.

10. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar, individual hydraulic motors for operation of the rams and for operation of the table oscillator, an hydraulic pressure source for effecting operation of said motors, means operable by an individual ram motor during its cutting stroke for effecting actuation of the table motor to retract the associated work support from said ram, additional ram actuated means for subsequently stopping the machine at the completion of the operative stroke of the ram, alternatively available manual control means selectively operable to check all movement of the machine at any point during the stroke thereof, and an automatic mechanical lock coupled with the manual stopping device for positively securing a descending broach against continued movement when the manual stop lever is operated.

11. In a broaching machine, the combination with a bed, of a pair of vertically movable broaching rams supported thereby, a work table unit pivoted to the bed intermediately of the rams having a pair of work supporting portions individually alignable with a respective ram by oscillation of the table, means for controlling the position of said table and work supports including a shifter yoke on the table, locking members on the table, and a slideable locking bar for engagement with the locking members on the table, and an actuator carried by the bed having a portion engaging the locking bar for imparting successive releasing and locking movements thereto and a related portion engageable with the shifting yoke on the table for effecting an oscillation of the table intermediate the releasing and locking positions of the bar, individual hydraulic motors for operation of the rams and for operation of the table oscillator, an hydraulic pressure source for effecting operation of said motors, means operable by an individual ram motor during its cutting stroke for effecting actuation of the table motor to retract the associated work support from said ram, additional ram actuated means for subsequently stopping the machine at the completion of the operative stroke of the ram, alternatively available manual control means selectively operable to check all movement of the machine at any point during the stroke thereof, individual mechanical locking devices automatically engageable with the respective broach rams for securing same against movement in either direction, and operating connections between the manual control lever and said locking devices whereby the position of the locking devices for the respective rams is determinable by shifting of the manual stop lever.

12. In a broaching machine of the character described, the combination with a support and a pair of vertical broach rams carried thereby and alternately operable through a descending broaching stroke, of an hydraulic actuating system for controlling the respective movements of the broaching rams, including a source of hydraulic fluid under pressure, means for selectively coupling the actuating fluid with either of the broach rams to produce a descending broaching stroke thereof, a return line simultaneously coupleable with the opposite ram for effecting reverse movement thereof, an exhaust discharge line from the second ram completeable through the hydraulic circuit control mechanism, and a pressure operable throttling valve in the return line reacting through the retracting ram on the ram during its operating stroke to maintain a predetermined hydraulic resistance to ram movement.

13. In a duplex broach of the character described, the combination with a support and a pair of hydraulically reciprocable broach rams carried thereby, of a work table mounted on the support, said table having work supports individual to the respective rams, means supporting the table for movement to alternately present the work supports to their respective rams, and an hydraulic actuating system for controlling the operation of said parts including a source of hydraulic pressure, an hydraulic motor for each ram, an hydraulic table control motor, a first control valve for determining the effective coupling of the hydraulic medium with the table motor, an additional control valve means for determining the effective coupling of the hydraulic medium with either of the ram motors for imparting a tooling movement to the coupled ram, and an auxiliary hydraulic circuit coupled with and controlled by the table control circuit for imparting non-tooling movements to the ram motors.

14. In a duplex broach of the character described, the combination with a support and a pair of hydraulically reciprocable broach rams carried thereby, of a work table mounted on the support, said table having work supports individual to the respective rams, means supporting the table for movement to alternately present the work supports to their respective rams, and an hydraulic actuating system for controlling the operation of said parts including a source of hydraulic pressure, an hydraulic motor for each ram, an hydraulic table control motor, a first control valve for determining the effective coupling of the hydraulic medium with the table motor, an additional control valve means for determining the effective coupling of the hydraulic medium with either of the ram motors for imparting a tooling movement to the coupled ram, an auxiliary hydraulic circuit coupled with and controlled by the table control circuit for imparting non-tooling movements to the ram motors, and auxiliary control devices actuable by the respective rams for determining the effective connection of the auxiliary hydraulic circuit with their respective motors.

15. In a duplex broach of the character described, the combination with a support and a pair of hydraulically reciprocable broach rams carried thereby, of a work table mounted on the support, said table having work supports individual to the respective rams, means supporting the table for movement to alternately present the work supports to their respective rams, and an hydraulic actuating system for controlling the operation of said parts including a source of hydraulic pressure, an hydraulic motor for each ram, an hydraulic table control motor, a first control valve for determining the effective coupling of the hydraulic medium with the table motor, an additional control valve means for determining the effective coupling of the hydraulic medium with either of the ram motors for imparting a tooling movement to the coupled ram, an auxiliary hydraulic circuit coupled with and controlled by the table control circuit for imparting non-tooling movements to the ram motors, and auxiliary control devices actuable by the respective rams for determining the effective connection of the auxiliary hydraulic circuit with their respective motors, said means being alternatively positionable to relieve hydraulic pressure within the motor.

16. In a duplex broach of the character described, the combination with a support and a pair of hydraulically reciprocable broach rams carried thereby, of a work table mounted on the support, said table having work supports individual to the respective rams, means supporting the table for movement to alternately present the work supports to their respective rams, and an hydraulic actuating system for controlling the operation of said parts including a source of hydraulic pressure, an hydraulic motor for each ram, an hydraulic table control motor, a first control valve for determining the effective coupling of the hydraulic medium with the table motor, an additional control valve means for determining the effective coupling of the hydraulic medium with either of the ram motors for imparting a tooling movement to the coupled ram, an auxiliary hydraulic circuit coupled with and controlled by the table control circuit for imparting non-tooling movements to the ram motors, and auxiliary control devices actuable by the respective rams for determining the effective connection of the auxiliary hydraulic circuit with their respective motors, said means being alternatively positionable to lock the hydraulic motor against movement in one direction.

17. In a duplex broach of the character described, the combination with a support and a pair of hydraulically reciprocable broach rams carried thereby, of a work table mounted on the support, said table having work supports individual to the respective rams, means supporting the table for movement to alternately present the work supports to their respective rams, and an hydraulic actuating system for controlling the operation of said parts including a source of hydraulic pressure, an hydraulic motor for each ram, an hydraulic table control motor, a first control valve for determining the effective coupling of the hydraulic medium with the table motor, an additional control valve means for determining the effective coupling of the hydraulic medium with either of the ram motors for imparting a tooling movement to the coupled ram, and an auxiliary hydraulic circuit coupled with and controlled by the table control circuit for imparting non-tooling movements to the ram motors, said auxiliary control device having additional operative positions effective to block movement of the hydraulic motor in a given direction or to release excess actuating pressure therein.

18. A duplex hydraulically actuable broaching machine, including a pair of work supporting means and a pair of broach supporting means, an hydraulic motor individual to each work and broach support for effecting a relative movement thereof, an hydraulic circuit selectively coupleable with either of said motors for effecting a given actuation thereof, a second hydraulic circuit interconnecting the motors whereby an actuation of one will react and effect an opposite movement of the other, an auxiliary hydraulic circuit individual to each of the motors, and means independently controlling said auxiliary hydraulic circuits whereby the reactance effect of the interconnect of the motor interconnecting circuit on an individual motor actuated thereby may be variably determined.

19. A duplex broaching machine of the character described, including a bed, work supporting means mounted on the bed, a pair of broach operating rams supported by the bed and reciprocable with respect to the work support, a main hydraulic actuating circuit selectively coupleable with either of the rams for imparting a tooling movement thereto, a second hydraulic circuit interconnecting the rams whereby a tooling movement of one will displace the hydraulic medium in the circuit and effect a retraction of the other ram, a supplemental hydraulic circuit including input and exhaust lines, means selectively determining the coupling of the input and exhaust lines with the interconnecting hydraulic circuit whereby the ultimate retraction of an individual ram may be variably determined, control means for selectively determining the energization of the supplemental hydraulic circuit, and ram operated means for operating said last mentioned control means.

20. A duplex broaching machine of the character described, including a bed, work supporting means mounted on the bed, a pair of broach operating rams supported by the bed and reciprocable with respect to the work support, a main hydraulic actuating circuit selectively coupleable with either of the rams for imparting a tooling movement thereto, a second hydraulic circuit interconnecting the rams whereby a tooling movement of one will displace the hydraulic medium in the circuit and effect a retraction of the other ram, a supplemental hydraulic circuit including input and exhaust lines, means selectively determining the coupling of the input and exhaust lines with the interconnecting hydraulic circuit whereby the ultimate retraction of an individual ram may be variably determined, control means for selectively determining the energization of the supplemental hydraulic circuit, adjustable means effective at a predetermined point in the tooling stroke of one ram for effecting energization of the auxiliary control circuit, and additional variably positionable means shifable by the controlled retracted ram for variably determining the effective reaction of the auxiliary control circuit as respect said retracted ram.

21. A duplex broaching machine of the character described, including a pair of broach actuating rams, individual hydraulic motors for effecting reciprocation of the rams, an hydraulic circuit interconnecting the ram motors for effecting their simultaneous movement in opposite directions, and means individual to each motor for variably determining the stroke of said motor irrespective of the stroke of the interconnected motor.

22. In a broaching machine of the character described, the combination with a bed or support, of a pair of broach rams mounted thereon for movement relative thereto, work supporting means mounted on the bed having work holders individual to individual rams, said work holding means being shiftable to operatively relate one work holder to its respective ram and simultaneously shift another work holder into loading position, hydraulic motors individual to the rams and to the work supporting means for effecting the several shiftings thereof and an hydraulic circuit for operation of the parts including a main hydraulic pressure line, valve means for controlling the broach ram movements, additional valve means for controlling the table movements, independent branch lines from the main hydraulic pressure circuit to each of said valves, and adjustable dog means individual to each of the rams and valve operating instrumentalities projecting into the path of movement of said dogs and consecutively engageable thereby to sequentially shift the respective valves, substantially as and for the purpose described.

23. In a broaching machine of the character described, the combination with a bed or support, of a pair of broach rams mounted thereon for movement relative thereto, work supporting means mounted on the bed having work holders individual to individual rams, said work holding means being shiftable to operatively relate one work holder to its respective ram and simultaneously shift another work holder into loading position, hydraulic motors individual to the rams and to the work supporting means for effecting the several shiftings thereof and an hydraulic circuit for operation of the parts including a main hydraulic pressure line, valve means for controlling the broach ram movements, additional valve means for controlling the table movements, independent branch lines from the main hydraulic pressure circuit to each of said valves, adjustable dog means individual to each of the rams and valve operating instrumentalities projecting into the path of movement of said dogs and consecutively engageable thereby to sequentially shift the respective valves, substantially as and for the purpose described, a manually operable valve controlling the pressure supply to the main actuating circuit, and means for mechanically locking the rams against movement when said valve is shifted into pressure disconnecting position.

24. In a hydraulic broaching machine, the combination with a support and a broaching ram rising therefrom, an hydraulic motor for effecting vertical reciprocation of the ram, a control circuit for said motor including an hydraulic pressure source, a reversing valve determining the effective coupling of said source with the motor, and a blocking valve intermediate the source and reversing valve having a pressure receiving chamber effective to shift the valve into non-blocking position, and a normally effective ram locking device having a control member inter-engaged with the valve whereby pressure effected movement of the valve into unlocking position will simultaneously shift the locking member in a disengaging relation to the ram.

25. A hydraulically operable broaching machine including a bed or support, a pair of spaced broach actuating rams mounted on the bed, a work table pivoted to the bed and bearing work supports presentable individually to individual rams upon oscillation of the table, and means for controlling the position of said table and work supports including an hydraulic motor, a table locking device having positive motion transmitting connections with the motor and a table oscillating device having lost motion connection as respects the motor whereby actuation of the table control motor will first release and subsequently oscillate the table.

26. In a broaching machine of the character described, including a bed, a pair of broach rams rising from the bed, a table oscillatably mounted on the bed and having work supports alternately operatively relatable with the rams by oscillation of the table, and means for effecting prescribed table oscillation and for securing the same in desired oscillative position, said means including an hydraulic motor, a reciprocable locking bar inter-meshing with the gear, the table having spaced sockets for inter-engagement with the locking bar in either position of oscillation of the table, and a lost motion yoke and pin connection between the gear and the table whereby subsequent to disengagement of the locking bar in the table socket the pin and yoke connection will be effective to oscillate the table and continued movement will interengage the locking bar with a prescribed table socket, substantially as described.

ERWIN G. ROEHM.